US012561385B2

(12) United States Patent　　　(10) Patent No.:　US 12,561,385 B2
Jacob　　　　　　　　　　　　　　　(45) Date of Patent:　　Feb. 24, 2026

(54) SYSTEM FOR DETERMINING INTERACTION OUTCOMES BETWEEN INDIVIDUALS

(71) Applicant: John Jacob, Moreno Valley, CA (US)

(72) Inventor: John Jacob, Moreno Valley, CA (US)

( * ) Notice: Subject to any disclaimer, the term of this patent is extended or adjusted under 35 U.S.C. 154(b) by 0 days.

(21) Appl. No.: 17/712,993

(22) Filed: Apr. 4, 2022

(65) Prior Publication Data

US 2022/0222308 A1　　　Jul. 14, 2022

Related U.S. Application Data

(63) Continuation of application No. 16/718,424, filed on Dec. 18, 2019.

(51) Int. Cl.
　*G06F 16/9536*　　　(2019.01)
　*G06F 16/9535*　　　(2019.01)
　*H04L 51/52*　　　　(2022.01)
(52) U.S. Cl.
　CPC ...... *G06F 16/9536* (2019.01); *G06F 16/9535* (2019.01); *H04L 51/52* (2022.05)
(58) Field of Classification Search
　CPC . G06F 16/9535; G06F 16/9536; H04L 51/52; G06Q 50/01
　See application file for complete search history.

(56) References Cited

U.S. PATENT DOCUMENTS

| | | | |
|---|---|---|---|
| 7,092,952 B1 * | 8/2006 | Wilens | G06Q 30/02 |
| 8,631,330 B1 * | 1/2014 | Hwang | G06F 21/629 |
| | | | 715/708 |
| 8,996,631 B1 * | 3/2015 | Staddon | H04L 9/3271 |
| | | | 709/200 |
| 10,831,765 B1 * | 11/2020 | Mehr | G06F 16/9535 |
| 2012/0041801 A1 * | 2/2012 | Mascarenhas | G06Q 30/0204 |
| | | | 705/7.32 |
| 2013/0067546 A1 * | 3/2013 | Thavasi | G06F 21/31 |
| | | | 726/7 |
| 2015/0095318 A1 * | 4/2015 | Burrus | G06F 16/24578 |
| | | | 707/723 |
| 2018/0068573 A1 * | 3/2018 | dos Reis Costa | G09B 5/06 |
| 2018/0146063 A1 * | 5/2018 | Dosi | G06Q 50/01 |
| 2018/0219938 A1 * | 8/2018 | Calcaterra | G06F 21/6218 |
| 2019/0102376 A1 * | 4/2019 | Agrawal | G06Q 50/01 |
| 2019/0272765 A1 * | 9/2019 | Nguyen | G09B 7/02 |
| 2019/0336030 A1 * | 11/2019 | Le | A61B 5/369 |

* cited by examiner

*Primary Examiner* — Etienne P Leroux

(74) *Attorney, Agent, or Firm* — The Rapacke Law Group, P.A.; Andrew Rapacke

(57)　　　　　ABSTRACT

A system for predicting the outcome of an interaction between users is provided. The system is comprised of a database in communication with one or more computing devices via a network. The database is configured to store user characteristics generated via a processor executing instructions stored in the database. The processor performs the steps of aggregating user characteristics and assigning the user characteristics to one or more identifiers. The identifiers are each comprised of two or more indicators each corresponding to at least one user characteristic.

18 Claims, 5 Drawing Sheets

200

300 —

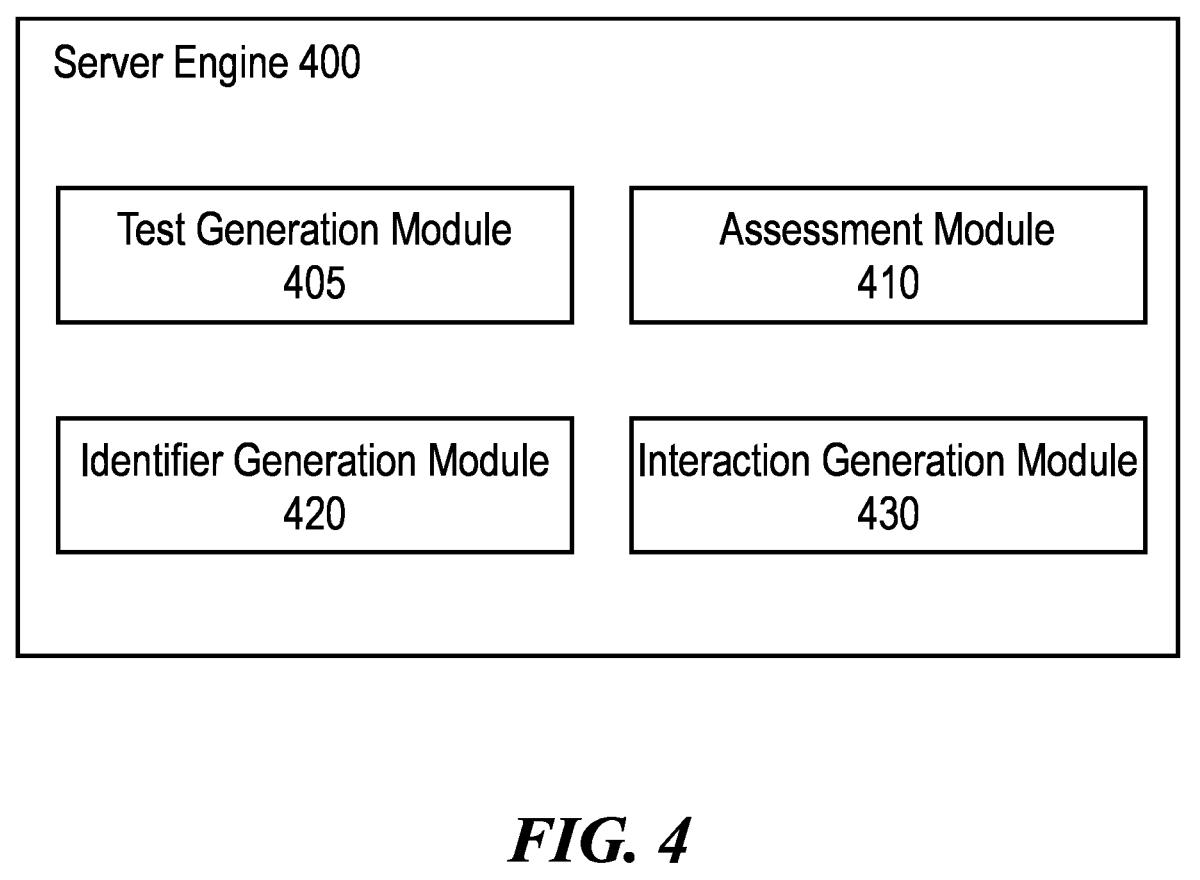

Server Engine 400

| Test Generation Module 405 | Assessment Module 410 |

| Identifier Generation Module 420 | Interaction Generation Module 430 |

*FIG. 4*

SYSTEM FOR DETERMINING INTERACTION OUTCOMES BETWEEN INDIVIDUALS

CROSS-REFERENCE TO RELATED APPLICATIONS

The present application is a continuation application of U.S. patent application Ser. No. 16/718,424, filed Dec. 18, 2019.

FIELD

The embodiments relate to systems for determining the quality and improving the likelihood of an interaction between individuals.

BACKGROUND

Human interaction is optimized when individuals perceive a connection between each other or to a group. As connection precedes change and alliance precede allowance, the value of cohesiveness is of extreme importance in a functional relationship (whether personal or professional).

The use of mobile devices has allowed humans to connect and interact with one another all around the world. This rise in connectivity can result in a topical relationship between friends, business acquaintances, and other forms of connections. While individuals and businesses have used various personality tests to determine the likelihood of a beneficial relationship between each party, these tests are often inaccurate or incomplete resulting in lost time and resources.

Recently, a variety of web-based and mobile applications use images to determine the likelihood of a valuable relationship based on physical appearance. These systems often lack understanding of the personal side of the individuals who are participating. Further, these systems do not take into consideration the vast amount of data now available which can be used to predict human interactions.

SUMMARY OF THE INVENTION

Embodiments disclosed herein provide a system for predicting the outcome of an interaction between users. The system is comprised of a database in communication with one or more computing devices via a network. The database is configured to store user characteristics generated via a processor executing instructions stored in the database. The processor performs the steps of aggregating user characteristics and assigning the user characteristics to one or more identifiers. The identifiers are each comprised of two or more indicators each corresponding to at least one user characteristic.

In one aspect, the two or more indicators are each comprised of an alphabetic character or numeric integer.

In one aspect, the user characteristic corresponds to a communication characteristic, an intimacy characteristic, a teamwork characteristic, or another useful characteristic as known in the arts.

In one aspect, the user is provided with a plurality of selectable interaction tabs on the computing device. Each tab corresponds to an interaction type.

In one aspect, the plurality of interaction tabs is comprised of the following: a relationship tab, a professional tab, a social/recreational tab, a personal tab, a neuro-connection tab, coaching/trainer tab, and an educational tab. Each tab allows for interactions to be predicted for the particular interaction type. A relationship interaction outcome, a professional interaction outcome, a neuro-connection outcome, a personal interaction outcome, a coaching interaction outcome, an educational interaction outcome, or another interaction type outcome is determined between two or more users within the community of users.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein:

FIG. 4 illustrates a block diagram of the server engine and modules, according to some embodiments.

DETAILED DESCRIPTION

Figure 1:
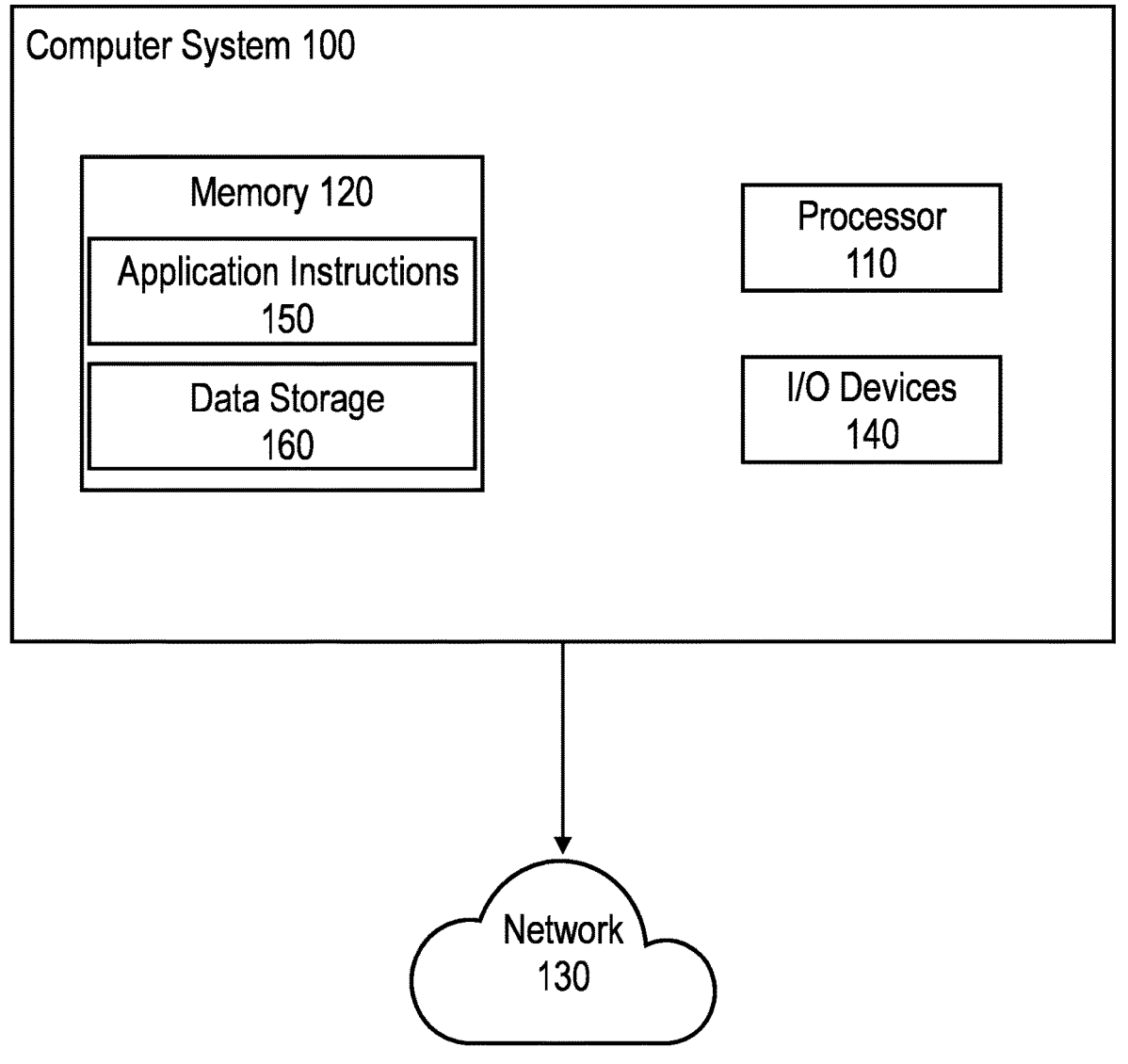
FIG. 1 illustrates a block diagram of the system for predicting the outcome of an interaction, according to some embodiments.

The specific details of the single embodiment or variety of embodiments described herein are set forth in this application. Any specific details of the embodiments are used for demonstration purposes only, and no unnecessary limitation or inferences are to be understood therefrom.

Before describing in detail exemplary embodiments, it is noted that the embodiments reside primarily in combinations of components related to the system. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The term "user(s)," as utilized herein can include individuals, businesses, or groups of humans. The system can be used to predict the interaction between a single user in addition to a group of users.

The term "interaction(s)" can be used to describe the reciprocal action or influence between individuals, groups, businesses, or combinations thereof. Interactions can include individuals, families, groups, businesses, teams, education, dating, or other users of the system.

In some embodiments, the user can select from a plurality of tabs on the GUI to select a type of interaction. For example, the user can select from a relationship tab, a professional tab, a personality tab, a neuro-connection tab, a social/recreational tab, a coaching/trainer tab, an educational tab, or likewise interaction type the user will engage in.

In some embodiments, the professional (or business) tab facilitates the aggregation and cultivation of compatible and competitive teams for general or specific business and professional purposes. This tab can be used to develop operating teams, customer support teams, marketing, licensing, negotiations and various other business-related interactions. The system may determine interactions between two or more users who are members of the business, one or more users who are members of the business and a consumers/customer, associates of the business, interviewers and interviewees, and/or interactions between consumers/customers.

In one example, the system facilitates the aggregation of information which is useful for service providers in the customer service industry as well as in the marketing industry. For example, the system applies an interaction theory to make connections between users stronger by determining commonalities between each user. In this manner, a marketing influencer can provide relevant information to a consumer. The system can use interaction theory to provide a unique interactive marketing influencer program for businesses or other users of the system.

In some embodiments, an AI engine analyzes user characteristics and generate a determination of future actions from the characteristics.

In some embodiments, a user acting as a business can utilize the system to make informed hiring decisions. In another example, the business user can utilize the system to improve interaction outcomes for employees and consumers alike.

In yet another example, an educator can select the education tab to enable further insight into the characteristics of each student in relation to the education and other students with whom they interact. This can be used to enhance the efficacy of the education environment to improve the output of the student.

In another embodiment, the user may select the relationship tab to enable dating/relationship compatibility to be predicted by the system. In one example, a test is provided to determine characteristics of the user.

Figure 3:
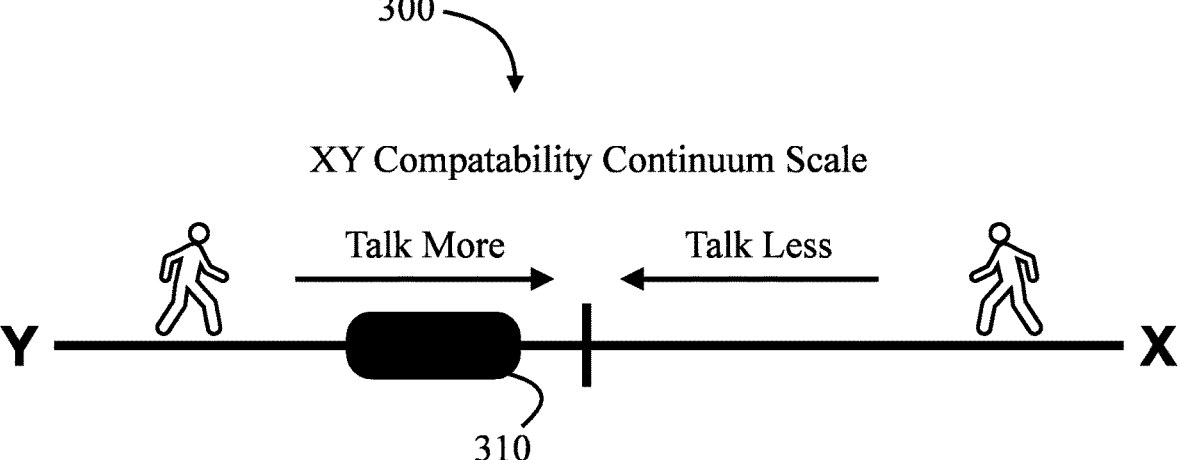
FIG. 3 illustrates a schematic of a couple's user identifiers displayed as a visual representation of their compatibility in communication, intimacy, adaptability, and interactivity, connectivity and connection, according to some embodiments.

In some embodiments, users in a relationship can select to view their couple compatibility on a visual continuum scale as shown in FIG. 3.

Figure 2:
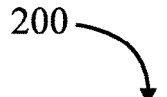
FIG. 2 illustrates a schematic of the user identifier and indicators, according to some embodiments.
Figure 2:
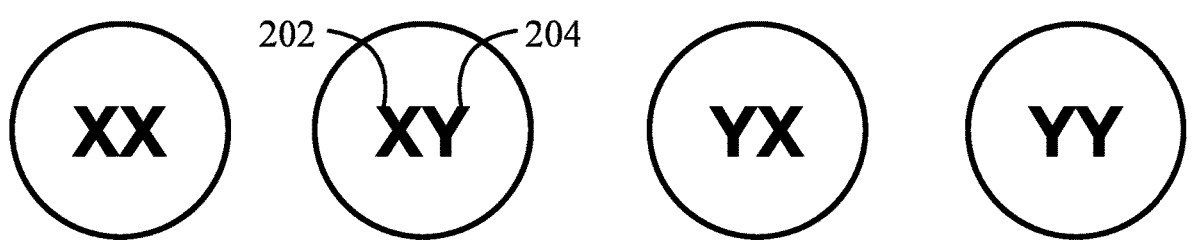

FIG. 2 illustrates a computer system 100, which may be utilized to execute the processes described herein. The computing system 100 is comprised of a standalone computer or mobile computing device, a mainframe computer system, a workstation, a network computer, a desktop computer, a laptop, or the like. The computer system 100 includes one or more processors 110 coupled to a memory 120 via an input/output (I/O) interface. Computer system 100 may further include a network interface to communicate with the network 130. One or more input/output (I/O) devices 140, such as video device(s) (e.g., a camera), audio device(s), and display(s) are in operable communication with the computer system 100. In some embodiments, similar I/O devices 140 may be separate from computer system 100 and may interact with one or more nodes of the computer system 100 through a wired or wireless connection, such as over a network interface.

Processors 110 suitable for the execution of a computer program include both general and special purpose microprocessors and any one or more processors of any digital computing device. The processor 110 will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

A network interface may be configured to allow data to be exchanged between the computer system 100 and other devices attached to a network 130, such as other computer systems, or between nodes of the computer system 100. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol.

The memory 120 may include application instructions 150, configured to implement certain embodiments described herein, and a database 160, comprising various data accessible by the application instructions 150. In one embodiment, the application instructions 150 may include software elements corresponding to one or more of the various embodiments described herein. For example, application instructions 150 may be implemented in various embodiments using any desired programming language, scripting language, or combination of programming languages and/or scripting languages (e.g., C, C++, C#, JAVA®, JAVASCRIPT®, PERL®, etc.).

The steps and actions of the computer system 100 described in connection with the embodiments disclosed herein may be embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

Also, any connection may be associated with a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

FIG. 2 illustrates a user identifier 200 having indicators 202, 204. The system can generate an identifier which is associated with the user depending on various user traits. This user identifier 200 defines the user's unique characteristics and is used to determine other users with common interests and an increased likelihood of a favorable connection therebetween. Users can input a search parameter to define their search of other users within the community.

In some embodiments, each indicator is a 202,204 alphabetical and/or numeric character such as for example, an X or a Y allowing for four possibilities for two factors including XX, XY, YX, and YY. These four possibilities can be used to predict compatibility between users within the community. Each of the four possibilities relates to factors which may represent the four dimensions of a relationship. In one example, the four factors include communication, intimacy, adaptability, and interactivity. The indicator X may relate to a high value and the Y to a low value, such that a user who receives indicators XY has high communication and low intimacy. The system may then determine that a user who receives an XY may not be compatible with a user who receives a YX.

FIG. 3 illustrates the compatibility continuum 300 in an exemplary embodiment. Each user can compare their compatibility with another. The system may determine a compatibility range 310 which indicates a probability of a favorable outcome between individuals. Compatibility may be determined by analyzing the individual's communication, intimacy, adaptability, interactivity, connectivity and connection, among other metrics as described herein.

In some embodiments, third-party users are in communication with the network. Third-party users may receive user information and advertise, counsel, or otherwise interact with the user. For example, a married couple which the system determines are incompatible with one another may receive advertisements for counseling to improve the likelihood of a successful relationship.

In some embodiments in particular, the user can view the degree to which a user has high, borderline, or low communication tendencies. This can be used to predict interactions as described hereinabove.

FIG. 4 illustrates a block diagram of the server engine 400 and modules. A test generation module 405 provides the user with an exam to determine various user characteristics. The test generation module 405 may determine a user type which may include user metrics such as goals of the user, etc. For example, the user indicates they are a teacher who wants to connect better with a group of students. The test generation module 405 then generates a test for the teacher and each student. An assessment module 410 configured to receive user information and determine a user type which may be displayed by the indicator. An identifier generation module 420 generates an indicator from information received from the assessment module. An interaction module 430 determines one or more events in which one or more users may attend. The attended events between the users raises the likelihood of an interaction between the users of the system by selecting users who are compatible and inviting the users to attend an event with compatible users.

Figure 5:
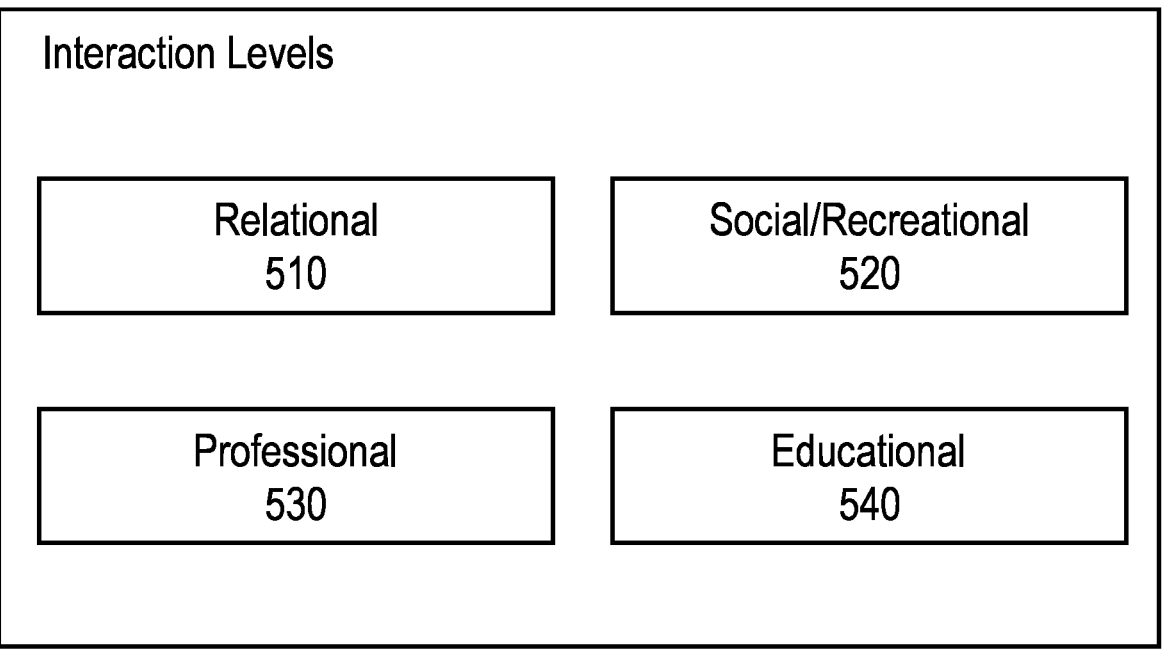
FIG. 5 illustrates a schematic of the bonding levels defining the user type, according to some embodiments.

FIG. 5 illustrates the levels of bonding or connection which is utilized by the system including relational 510, social/recreational 520, professional 530, educational 540 and coach/trainer. Each level of bonding defines a user type and gives the goals of the user. The relational 510 level is utilized by users interested in love and romance relationships with other users of the system. The social/recreational 520 level is used by users looking for recreational or social activities such as playing a sport or joining a social club. The professional 530 level is utilized by users who are interested in professional relationships such as a project manager building a team of employees. The educational 540 level may be used by teachers and students who are interested in connecting with compatible teachers or peers to form study groups, teams, or collaborations. The coach/trainer level may be used by trainers assigned to teach users how to become certified coaches.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A system for predicting the outcome of an interaction between users, the system comprising:
    a database in communication with one or more computing devices via a network, the database is configured to store user characteristics generated via a processor executing instructions stored in the database, the processor configured to:
    aggregate user characteristics; and
    assign the user characteristics to one or more identifiers, the identifiers comprised of two or more indicators, the two or more indicators corresponding to at least one user characteristic; and
    an artificial intelligence module configured to aggregate the user characteristics with the corresponding indicators to optimize user interactions.

2. The system of claim 1, wherein the two or more indicators are each comprised of an alphabetic character or numeric integer.

3. The system of claim 1, wherein the user characteristic corresponds to a communication characteristic.

4. The system of claim 1, wherein the user characteristic corresponds to an intimacy characteristic.

5. The system of claim 1, wherein the user characteristic corresponds to a teamwork characteristic.

6. The system of claim 1, wherein the user is provided a plurality of selectable interaction tabs on the computing device, wherein each tab corresponds to an interaction type.

7. The system of claim 1, wherein the plurality of interaction tabs is comprised of the following: a relationship tab, a professional tab, a social/recreational tab, a personal tab, a neuro-connection tab, coach/trainer tab, and an educational tab.

8. The system of claim 7, wherein a relational interaction outcome is determined between two or more users.

9. The system of claim 7, wherein a professional interaction outcome is determined between two or more users.

10. The system of claim 7, wherein an educational interaction outcome is determined between two or more users.

11. The system of claim 7, wherein a social/recreational interaction outcome is determined between two or more users.

12. The system of claim 7, wherein a personal interaction outcome is determined between two or more users.

13. The system of claim 7, wherein a neuro-connection interaction outcome is determined between two or more users.

14. A system for predicting the outcome of an interaction between users, the system comprising:

a database in communication with one or more computing devices via a network, the database is configured to store user characteristics generated via an assessment module in operable communication with a processor executing instructions stored in the database, the processor configured to perform the following:

aggregating, via the assessment module, user characteristics determined via a test generation module configured to provide a test to a plurality of users; and assigning the user characteristics to one or more identifiers, the identifiers generated via an identifier generation module and comprised of two or more indicators, the two or more indicators corresponding to at least one user characteristic; and an artificial intelligence module configured to aggregate the user characteristics and to modify algorithms of the identifier generation module and the test generation module to optimize user interactions.

15. The system of claim 14, further comprising an interaction module to determine a group of users suitable for an interaction event.

16. The system of claim 15, wherein the interaction module receives user identifiers from the identifier generation module.

17. The system of claim 14, wherein the plurality of interaction tabs is comprised of the following: a relationship tab, a professional tab, a social/recreational tab, a personal tab, a neuro-connection tab, and an educational tab.

18. A system for predicting the outcome of an interaction between users, the system comprising:

a database in communication with one or more computing devices via a network, the database is configured to store user characteristics generated via an assessment module in operable communication with a processor executing instructions stored in the database, the processor configured to perform the following:

aggregating, via the assessment module, user characteristics determined via a test generation module configured to provide a test to a plurality of users;

assigning the user characteristics to one or more identifiers, the identifiers generated via an identifier generation module and comprised of two or more indicators, the two or more indicators corresponding to at least one user characteristic;

determining, via an interaction module, a group of users suitable to attend an interaction event; and generating a plurality of interaction tabs comprising a relationship tab, a professional tab, a social/recreational tab, a personal tab, a neuro-connection tab, and an educational tab; and an artificial intelligence module configured to aggregate user characteristics and to modify algorithms of the identifier generation module, the interaction module, and the assessment module to optimize user interactions.

* * * * *